(12) United States Patent
Kawase

(10) Patent No.: US 7,379,118 B2
(45) Date of Patent: May 27, 2008

(54) ELECTRONIC CAMERA APPARATUS

(75) Inventor: Dai Kawase, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 827 days.

(21) Appl. No.: 10/290,036

(22) Filed: Nov. 7, 2002

(65) Prior Publication Data

US 2003/0147003 A1  Aug. 7, 2003

(30) Foreign Application Priority Data

Nov. 9, 2001  (JP) .......................... 2001-345282

(51) Int. Cl.
*H04N 5/225* (2006.01)
*H04N 5/222* (2006.01)

(52) U.S. Cl. ...................... 348/372; 348/371
(58) Field of Classification Search ................ 348/372, 348/371; 396/206, 205
See application file for complete search history.

(56) References Cited

U.S. PATENT DOCUMENTS 5,367,355 A * 11/1994 Foust ........................ 396/61
5,463,419 A * 10/1995 Saito ........................ 348/231.9
5,634,146 A * 5/1997 Goo .......................... 396/61
6,233,016 B1 * 5/2001 Anderson et al. ........... 348/372
6,421,506 B1 * 7/2002 Maruyama .................. 396/303
6,980,252 B1 * 12/2005 Akizuki et al. ............. 348/372

FOREIGN PATENT DOCUMENTS

JP  07-044281  2/1995
JP  10-080069  3/1998

* cited by examiner

*Primary Examiner*—David Ometz
*Assistant Examiner*—Luong T. Nguyen
(74) *Attorney, Agent, or Firm*—Frishauf, Holtz, Goodman & Chick, P.C.

(57) ABSTRACT

An electronic camera device according to the first aspect of the present invention comprises a battery which supplies a power supply, a detector which detects a state of the power supply of the loaded battery, a flash device configured to illuminate a subject, a charge controller which controls a charge processing of charging an energy supplied to the flash device, a processing part which executes at least one processing requiring an electric power more than a predetermined value except a charge processing, and a part configured to execute the charge processing and at least one processing each unit of a predetermined processing by timesharing while keeping the electric power supplied by the battery to maximum.

6 Claims, 4 Drawing Sheets

ELECTRONIC CAMERA APPARATUS

CROSS-REFERENCE TO RELATED APPLICATION

This application is based upon and claims the benefit of priority from the prior Japanese Patent Application No. 2001-345282, filed Nov. 9, 2001, the entire contents of which are incorporated herein by reference.

BACKGROUND OF THE INVENTION

1. Field of the Invention

The present invention relates to an electronic camera device comprising a flash device, and especially relates to an electronic camera device to which an efficiency of the charge of the flash device is achieved.

2. Description of the Background Art

Recently, an electronic camera, which records a subject image obtained by imaging a subject with an imaging device such as CCD in a semiconductor memory etc. as an electronic information, is actively developed. This kind of camera has a display device such as a liquid crystal panel to display a through image (real-time image) in addition to a usual viewfinder. There is also an electronic camera having a flash device.

In the electronic camera comprising the flash device, it is important how to charge the flash device efficiently from the battery, which has the finite electric power. In general, when the flash device is charged, other processing is stopped and only the flash device is charged. Concretely, the flash device is charged immediately after the power supply is turned on or immediately after photographing. In this case, other processing cannot be carried out while the flash device is charged. Originally, it is possible to photograph without using the flash device even if the flash device is uncharged. However, since the display of the through image to the liquid crystal panel has stopped while charging the flash device, too, it is impossible to photograph while seeing the liquid crystal panel. And, when the charging time of the flash device is long, it is more inconvenient since the photograph cannot be performed.

In a conventional electronic camera as mentioned above, when the flash device is charged, since only the processing of the charge is performed by stopping other processing, other processing cannot be carried out. Therefore, it is inconvenient because the photograph cannot be carried out when the charging time of the flash device is long.

The attempt at effective use of the electric power of the battery having the finite electric power is proposed. In the first proposal, the performance of an electronic equipment is managed so as not to exceed the consumption electric power by obtaining the consumption electric power which can be supplied during the set time (see Japanese Patent Application KOKAI Publication No. 7-44281 which is incorporated by reference). In the second proposal, when the remainder of the battery falls below a predetermined value, the display on the monitor and the charge of the capacitor for the flash are not executed at the same time (see Japanese Patent Application KOKAI Publication No. 10-80069 which is incorporated by reference). In the second proposal, it is proposed that the display on the monitor and the charge of the capacitor are performed at the same time, when the remainder of the battery is more than a predetermined value.

In each proposal as mentioned above, the control method is changed according to the remainder of the battery. However, it becomes inconvenient in case of the photograph like an electronic camera when the entire processing speed of the electronic equipment decreases uniformly like the first proposal. In a case that there are two or more processing which require the high-power like the second proposal, it is not easy to say that the use efficiency of the electric power will be used to its maximum in a timesharing method that two or more processing are not executed simultaneously. Moreover, the entire processing speed decreases, since electrical supply is limited when two or more processing are executed at the same time. Therefore, the influence on the photograph due to the decrease at the processing speed is large.

BRIEF SUMMARY OF THE INVENTION

An object of the present invention is to provide an electronic camera of which the flash device can be charged efficiently without stopping other processing and the convenience can be improved at the photograph.

To achieve the above-mentioned problem, the present invention adopts the following configurations.

An electronic camera device according to the first aspect of the present invention is characterized by comprising: a battery which supplies a power supply; a detector which detects a state of the power supply of the loaded battery; a flash device configured to illuminate a subject; a charge controller which controls a charge processing of charging an energy supplied to the flash device; a processing part which executes at least one processing requiring an electric power more than a predetermined value except a charge processing; and a part configured to execute the charge processing and at least one processing each unit of a predetermined processing by timesharing while keeping the electric power supplied by the battery to maximum.

An electronic camera device according to the second aspect of the present invention is characterized by comprising: a battery which supplies a power supply; a detector which detects a state of a power supply of the loaded battery; a driver which drives a lens; an imager which images a subject; an image processing part which processes an image data obtained with the imager when a predetermined period is one cycle and whose processing speed is variable; a display which displays the data obtained by the image processing part; a flash device which illuminates the subject; a charge controller which controls charge of an energy supplied to the flash device; and a setting part which performs at least one of processing of the image data by the image processing part and driving of the lens by the driver and the charge control by the charge controller by timesharing, when the data displayed at charging for a predetermined number of cycles, and sets at least one of a processing speed of the image processing part and driving speed of the driver is set according to the usable maximum electric power of the battery.

An electronic camera device according to the third aspect of the present invention is characterized by comprising: an imager which images a subject; an image processing part which processes the image data obtained by the imager at a predetermined cycle; a display which displays the data obtained by the image processing part; a flash device which illuminates the subject; a charge controller which controls a charge of the energy supplied to the flash device; a display controller which controls data displayed on the display to update display every cycles of one cycle or two or more cycles; and a setting part which performs processing of the image data by the image processing part and the charge control by the charge controller at the same time and sets the processing speed by the image processing part according to the usable maximum electric power of the battery to match to the cycle when the data displayed by the display is updated.

An electronic camera device according to the fourth aspect of the present invention is characterized by comprising: a flash device which illuminates a subject; an imager which images the subject; a display which displays an image data obtained by an imager as a visible image; a display controller which can vary a refresh rate by a display; a charge controller which can select an operation whether to charge the flash device when the display by the display is not carried out or to charge the flash apparatus when the display is carried out by the display; and a changer which changes the refresh rate by the display controller based on a selection result of the charge operation by the charge controller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, embodiments of the present invention will be explained with reference to the drawings.

First Embodiment

Figure 1:
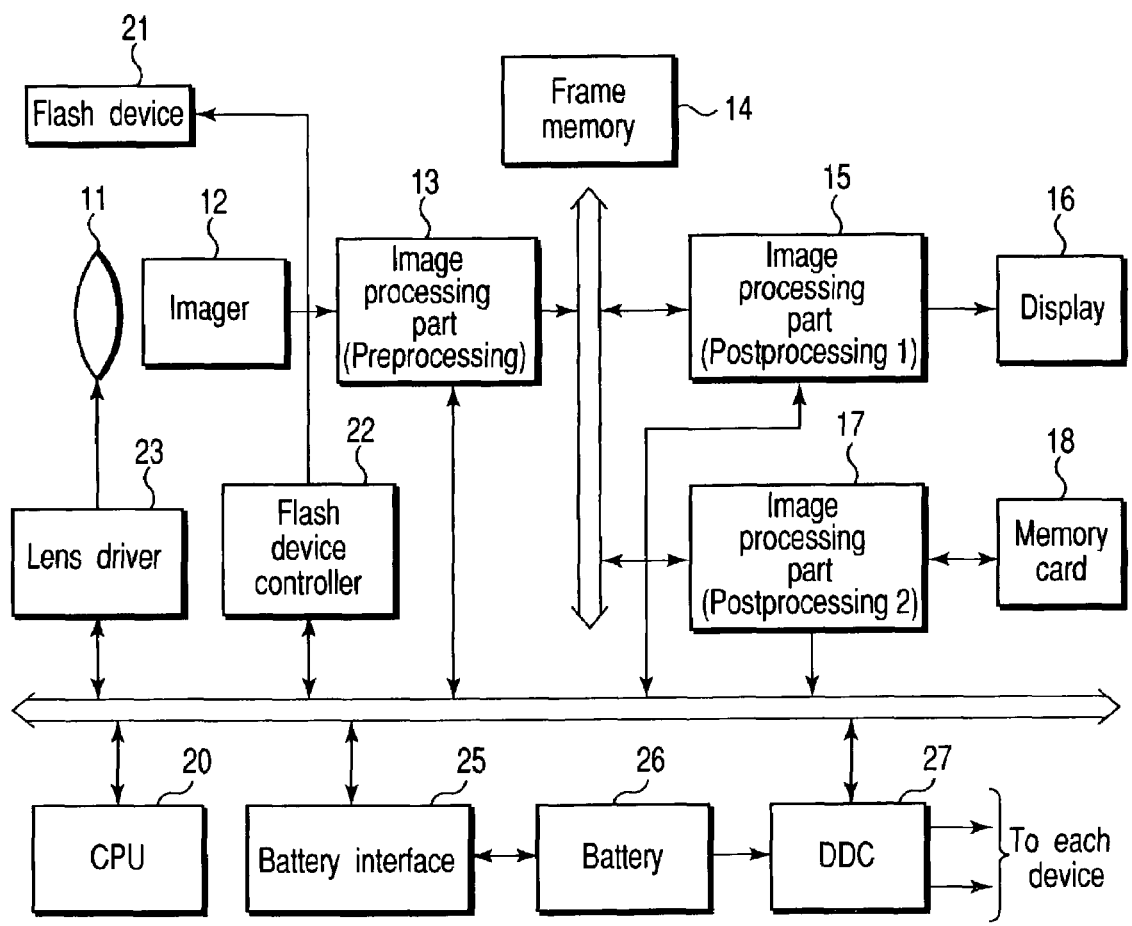
FIG. 1 is a block diagram which shows a schematic configuration of the electronic camera according to the first embodiment.

FIG. 1 is a block diagram which shows a schematic configuration of the electronic camera according to the first embodiment of present invention.

The image of the subject not shown in the figure is formed by the imaging lens 11 on the imager 12 such as CCD, and is imaged by the imager 12 to obtain the image signal. The image signal becomes image data by being processed by the image processing part 13 (preprocessing), and is memorized to the frame memory 14 temporarily. The image signal obtained from CCD imager 12 is an analog signal which corresponds to each pixel. The image data obtained by the image processing part 13 is a two dimensional bit map data to which an analog to digital conversion and various processing are performed.

The image data memorized in the frame memory 14 is processed by the image processing part 15 (postprocessing 1), and thereafter, is supplied to the display 16 which consists of the liquid crystal etc. And, the subject image imaged on the imager 12 is displayed on the display 16. The image processing by the image processing part 15 is a conversion processing of converting the bit map data into the image signal which can be displayed on the display 16. In general, the processing by the image processing part 15 requires a larger electric power than the processing by the image processing part 13. The display 16 performs a moving image substantially by displaying static images at interval of one several-tenth second. The image displayed on the display 16 is a through image (real-time image) obtained in the imager 12.

When the photograph operation by the user is performed, the image data memorized in the frame memory 14 is processed by the image processing part 17 (postprocessing 2), and is recorded to the record media 18 of the semiconductor memory etc. The data obtained by the image processing part 17 is an image data such as TIFF and JPEG images which are compressed bit map data. The data recorded on the memory card 18 is not limited to the data of the static image but may be data of the moving image.

As for the flash device 21, the luminescence and the charge of the flash device are controlled by the flash device controller 22 under the control of the CPU 20. The lens 11 is driven by the driving of the lens 23 under the control of the CPU 20.

The battery 26 installed in the electronic camera and the DDC (DC-DC-Converter) 27 transmit and/or receive the signal to/from the CPU 20 through the battery interface 25, and supply the voltage required for each part of the electronic camera based on the instruction from the CPU 20. In FIG. 1, though the battery interface 25 and the CPU 20 are configured to perform the data communication through the data bus, they may be connected through all other communication means (which may be wireless and/or cable) or may be connected directly with the CPU 20. The battery 26 may supply only the power supply and may incorporate a control circuit. By monitoring the voltage etc. by the control circuit, the monitor result may be memorized to the memory. The-battery 26 controls the electric power supply with the control circuit not shown in the figure (or, incorporated) based on the instruction from the CPU 20.

Figure 2:
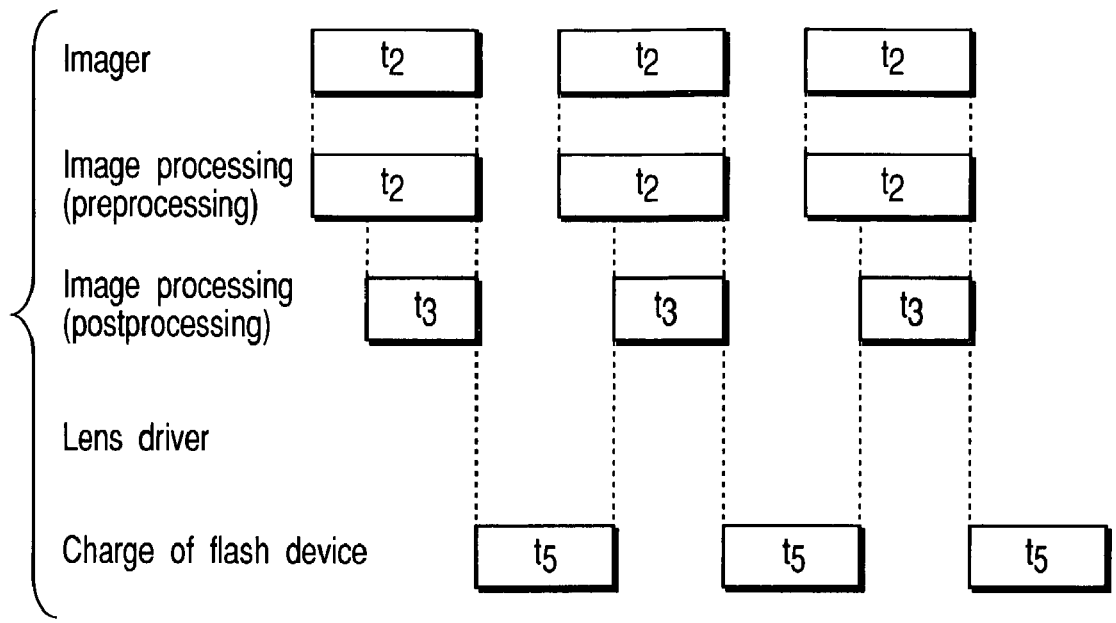
FIG. 2 is a timing chart to explain the operation of the electronic camera in the first embodiment.

FIG. 2 is a timing chart to explain the operation of the electronic camera in the first embodiment. In FIG. 2, t2 is a processing time of the imager 12 and the image processing part 13, t3 is a processing time of the image processing part 15, and t5 is a charging time of the flash device.

The imager 12 outputs, for instance, the thirty image signals/sec. The signal is processed (preprocessed) by the image processing part 13 whenever the image signal is output (every one cycle) and is memorized to the frame memory 14. And, the image data memorized to the frame memory 14 is processed (postprocessed) to the image signal, which can be displayed on the display 16, by the image processing part 15. Then, the charge of the flash device 21 is started at the same time as the end of postprocessing at each cycle. The charge of the flash device continues until the postprocessing at the next cycle starts.

Figure 3:
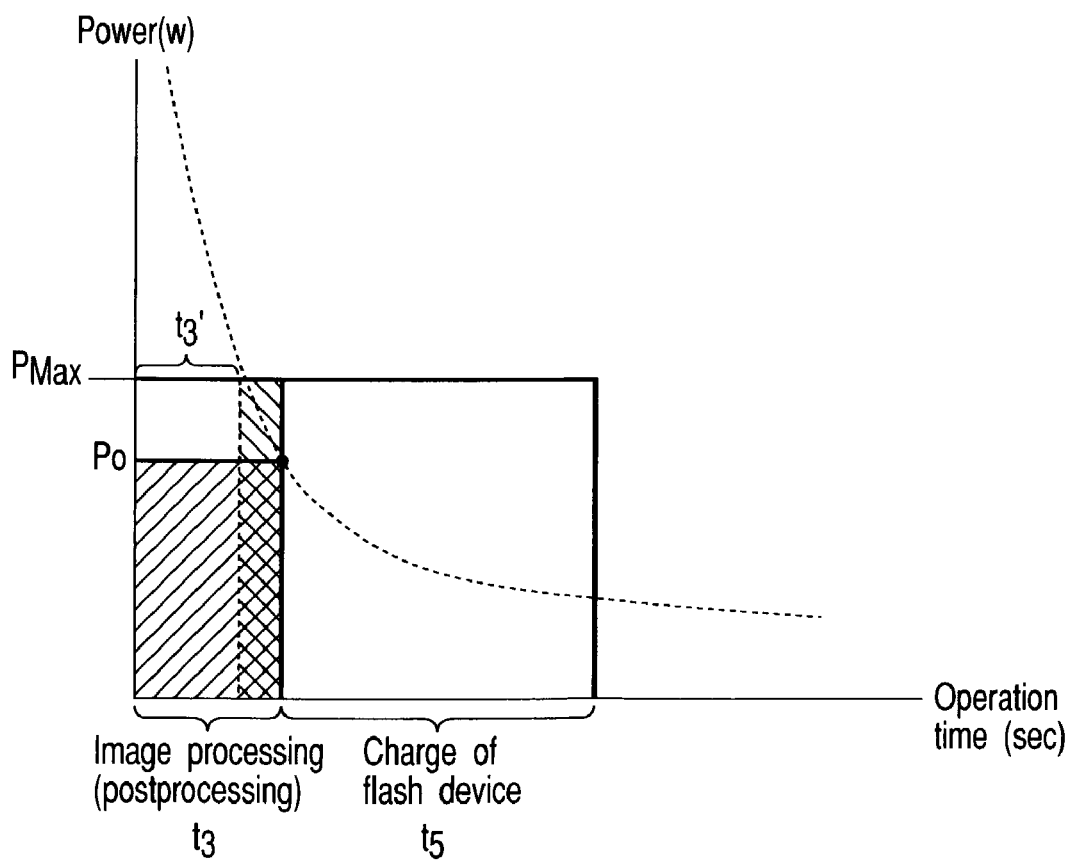
FIG. 3 is a figure which shows a relationship between postprocessing of the through image display at one cycle and the charge of the flash device in the first embodiment.

The relation to postprocessing (t3) at one cycle of the through image display and the charge (t5) of the flash device is shown in FIG. 3. The image processing (postprocessing) is performed first, and the charge of the flash device is started at the same time as this ending. The charge of the flash device is performed to the end of the cycle (more accurately, until the postprocessing at the next cycle starts) (Hereafter, this method is called "timesharing method").

Here, an operation speed of the image processing part 15 to perform the postprocessing is variable. Time t3 required for postprocessing shortens when operation speed increases, and the required electric power increases. Oppositely, the required electric power decreases though time t3 required for postprocessing becomes long if the operation speed decreases. The relation between the processing time t3 and the electric power is shown by the broken line in FIG. 3. The operation speed is decided according to the maximum electric power of a present battery. That is, the image processing part 15 is operated by the maximum electric power Pmax of the battery at present. As a result, the processing time in the image processing part 15 can be made a minimum, and the following charge period of the flash device can be extended. By supplying a voltage enough to secure the operation speed of the image processing part 15 by controlling the DDC 27, the processing time can be shortened by optimal use of the electric power.

For instance, the processing time in the image processing part 15 becomes t3' by performing the postprocessing with the maximum electric power Pmax if it is assumed that the time t3 is necessary when the postprocessing is performed at the electric power Po (<Pmax) in FIG. 3. As a result, it becomes possible to lengthen the charging time of the flash device because the further interval time (t3-t3') can be secured to the part shown by the hatching. Therefore, the charge of the flash device can be performed more effectively.

According to the first embodiment, in each cycle to display the real-time through image obtained with the image processing part 15, it becomes possible to perform the operation for the following photographing while charging the flash device by performing the image processing (postprocessing) and the charge control of the flash device by the timesharing method. As a result, convenience as a camera can be improved. By setting the processing speed by the image processing part 15 such that the image processing part 15 is operated at the maximum electric power of the battery being in use, the energy allotted to the charge of the flash device at one cycle can be maximized. As a result, it becomes possible to efficiently charge the flash device 21.

Second Embodiment

The second embodiment lowers the update rate of the display data by displaying the output signal of the imager 12 in the display 16 by thinning out not in real time.

Figure 4:
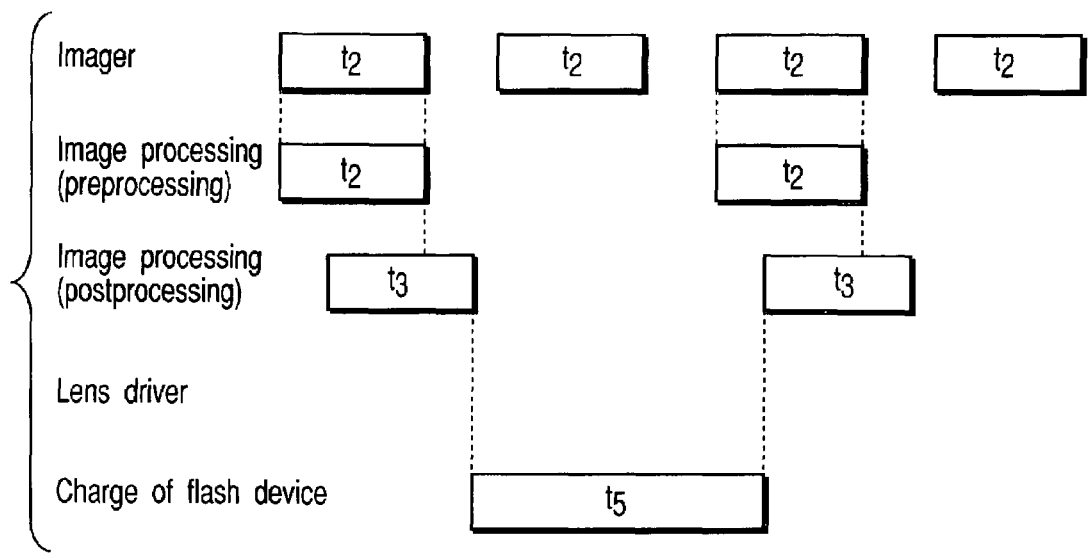
FIG. 4 is a timing chart to explain the operation of the electronic camera in the second embodiment.

As shown in FIG. 4, the image processing parts 13 and 15 process an image of the image signal at a half rate (for instance, every ¹/₁₅ second), and the update rate of the display data in the display 16 is ½ of the usual signal. The image which images with the imager 12 is not displayed once every two times, but the same image may be displayed in two cycles in the second embodiment.

When the flash device 21 is charged, all periods of not only periods except processing of the image of one cycle but also the next cycles can be used in the second embodiment. Therefore, the charge efficiency of the flash device 21 can be enhanced further, compared with the first embodiment.

Third Embodiment

Though the image processing and the charge of the flash device are performed by the timesharing method in the first and second embodiments, when a large electric power is required to drive the lens more than the image processing, driving of the lens and the charge of the flash device may be performed by the timesharing method.

Figure 5:
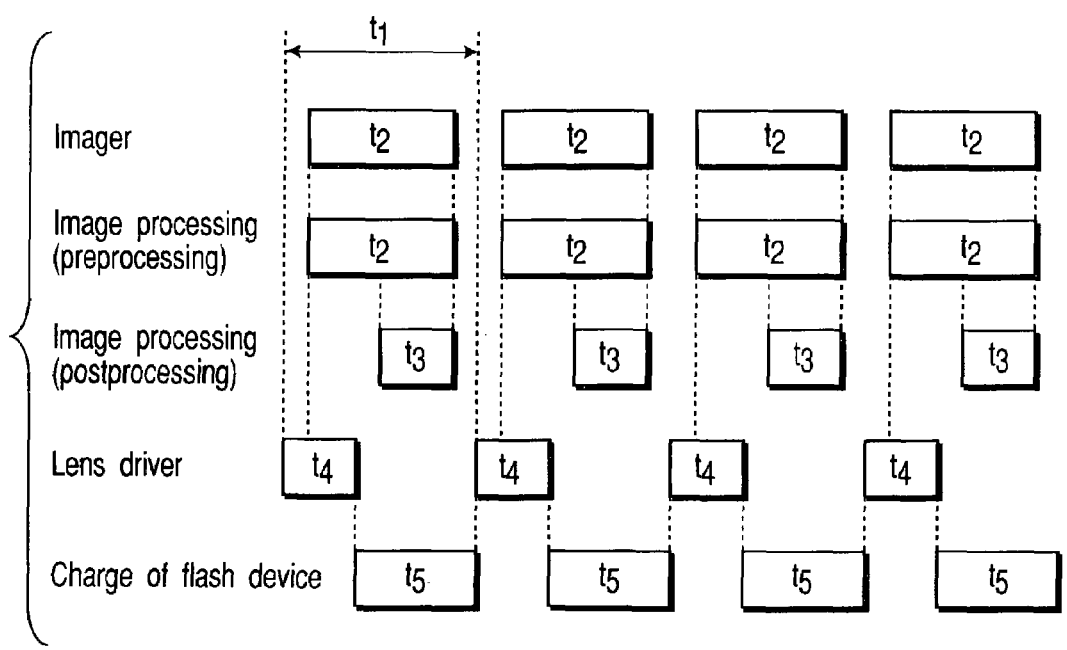
FIG. 5 is a timing chart to explain the operation of the electronic camera in the third embodiment.

FIG. 5 is an example of performing the driving of the lens and the charge of the flash device by the timesharing method. In one cycle period of t1, the operation of the imager 12 and the image processing (preprocessing) are indicated by t2, the image processing (postprocessing) is indicated by t3, the driving of the lens is indicated by t4, and the charge of the flash device is indicated by t5. The driving of the lens (t4) is performed first at period t1 in each cycle, and thereafter imaging and preprocessing (t2) are performed. And, after the driving of the lens (t4) ends, postprocessing (t3) and charge (t5) of the flash device are performed. The charge (t5) of the flash device is performed to the end of the cycle though postprocessing (t3) ends in the middle of the cycle.

Fourth Embodiment

The fourth embodiment is an embodiment which lowers the refresh rate in the display 16 as in the third embodiment, in the method of performing the driving of the lens and the charge of the flash device by the timesharing method.

Figure 6:
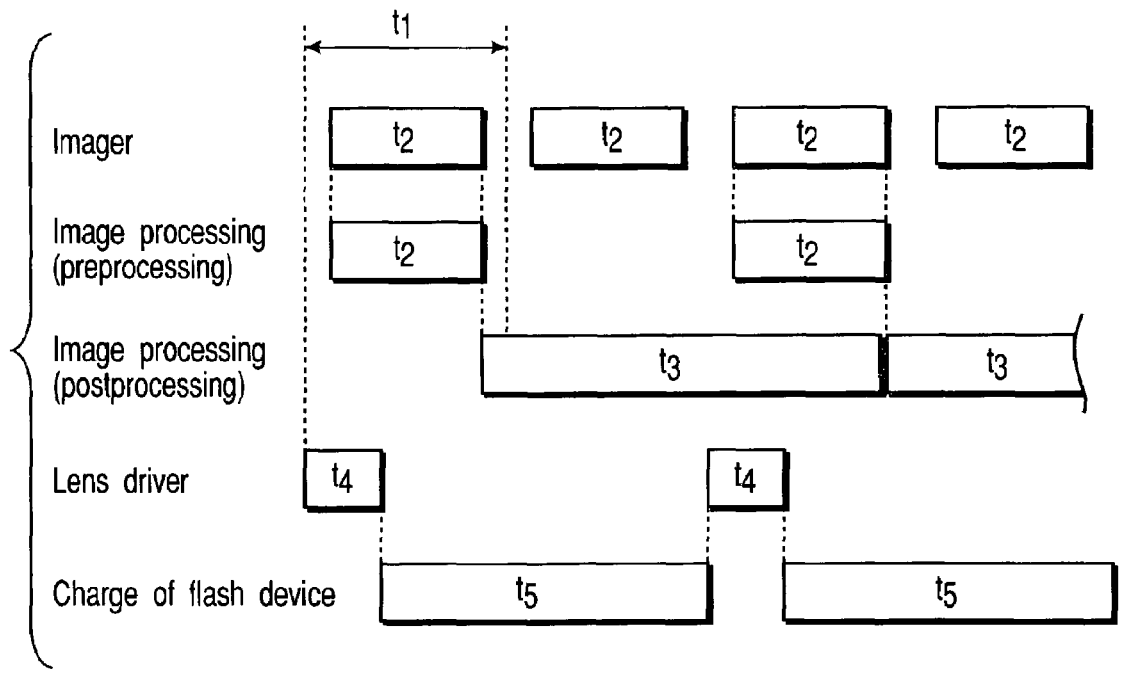
FIG. 6 is a timing chart to explain the operation of the electronic camera in the fourth embodiment.

As shown in FIG. 6, the image processing parts 13 and 15 process the image signal at the half rate, and the refresh rate in the display 16 is ½. Here, the image signal may not be displayed once every two times of the image signal, but may be display the same image in two cycles.

The driving of the lens (t4) is performed first at period t1 in each cycle, and thereafter imaging and preprocessing (t2) are performed. Since the refresh rate is adjusted to ½, the driving of the lens (t4) may be once every two times. After the driving of the lens (t4) ends in one cycle, postprocessing (t3) and charge (t5) of the flash device are performed. Charge (t5) of the flash device is performed to the end of the next cycle. Postprocessing (t3) need not finish in one cycle because the refresh rate is set to ½, may be extended over the next cycle, and may be performed immediately before starting postprocessing in the next cycle. As a result, it is possible to allocate an electric power to the charge of the flash device by saving an electric power necessary for postprocessing.

In the fourth embodiment, the charge of the flash device can use not only periods except processing of the image in one cycle but also the whole next cycle. Therefore, the total time, until the flash device 21 is completely, charged can be shortened compared with the third embodiment.

Fifth Embodiment

In the first to fourth embodiments, the example of performing the charge of the flash device and processing, which requires a large electric power (image processing and driving of the lens), by the timesharing method is explained. On the contrary, the example of performing the charge of the flash device and processing, which requires a large electric power (image processing and driving of the lens), may be performed at the same time.

Figure 7:
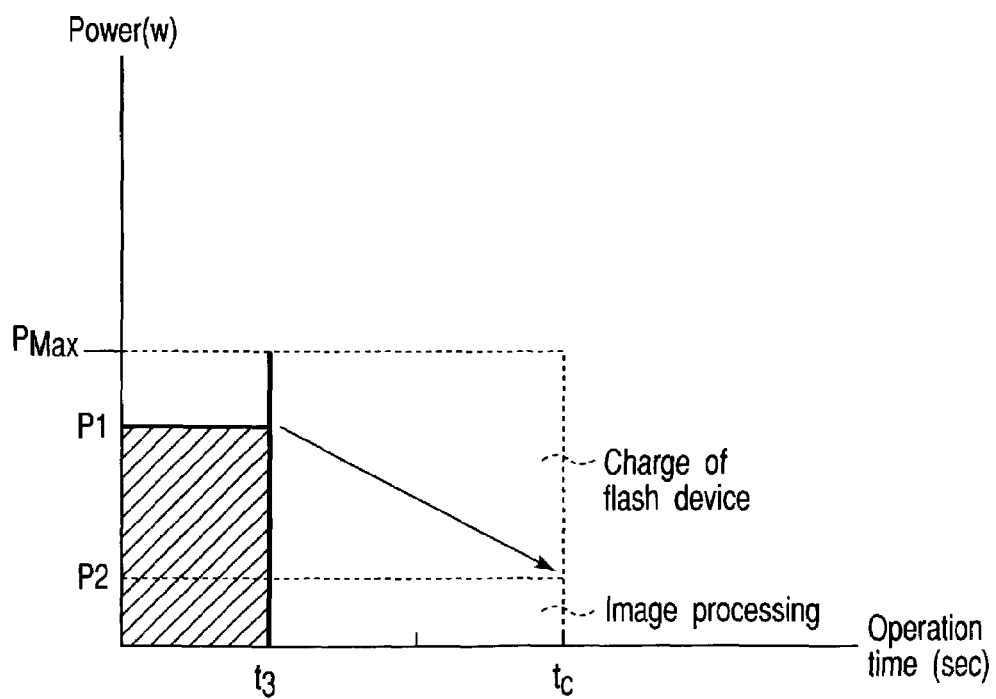
FIG. 7 is a figure which shows a relationship between postprocessing of the through image display at one cycle and the charge of the flash device in the fifth embodiment.

FIG. 7 shows an embodiment which performs the charge of the flash device and the image processing at the same time. Here, the operation frequency in the image processing part 15 is lowered while using the electric power when the flash device is charged in maximum (The maximum electric power is supplied), the processing speed is lowered enough, and the processing ends at the time of the end of the cycle. That is, the processing speed is decreased so that the period, when the image is processed by image processing part 15, is ended at the update period of the display (That is, one or more cycle periods), but the image processor is operated by the electric power P1 conventionally. As a result, an electric power which is necessary for, for instance, the image processing part 15 becomes P2, and charges the flash device by the electric power of (Pmax-P2). As a result, though the time required to process the image by the image processing part 15 is postponed from t3 to tc, this image processing only may end at the update of the display image. Thus, the consumption electric power in the image processing part 15 decreases, and the electric power thereof can be allocated to the charge of the flash device.

In the fifth embodiment, by lowering the operation frequency in the image processing part 15 enough, the energy required it to the charge of the flash device in one unit of the predetermined processing (one cycle) can be made uniform.

By changing the control method (sequence) according to each of above-mentioned embodiments, the charge of the flash device can be controlled while using the electric power in maximum.

That is, other operations can be performed after the charge of the flash device ends as in conventional art, but the agreeable operation such as photographs can be provided to the user by the following operations.

It becomes possible to use the use efficiency of the electric power to its maximum even in a case of the timesharing method that two or more processing are not executed simultaneously etc. by two or more processing which require the high-power. Additionally, when two or more processing which require the high-power is performed at the same time, each processing is executed so that the predetermined processing (for instance, postprocessing) other than the charge of the flash device ends in the predetermined time (end of one cycle or end of the second cycle when performing display once every two cycles) a low speed operation (that is, the power supply lowers for other processing) while keeping the electrical supply to the maximum electric power. Therefore, influence on the performance in the photograph is little caused by the decrease of the processing speed. Therefore, the flash device can be efficiently charged, and the convenience of the camera improves.

(Modification)

The present invention is not limited to each of above-mentioned embodiments. The configuration of the main body of the camera only is not limited to FIG. 1, but may be a configuration of performing the charge of the flash device and the image processing or the driving of the lens according to timing shown in FIG. 2, FIG. 4, FIG. 5, and FIG. 6, etc. The charge of the flash device and the timesharing method or the processing using them are not limited to the image processing and the driving of the lens, but may properly select processing which requires a large electric power in processing other than the charge of the flash device.

Though the embodiment applied to an electronic camera is explained in each above-mentioned embodiment, it is possible to apply also to the communication terminal (for instance, PDA, portable telephone, and PHS, etc.) with the camera comprising the flash device.

The following inventions can be extracted from each of above-mentioned embodiments. The following inventions may be applied solely, and applied by combining them.

An electronic camera device according to the first aspect of the present invention is characterized by comprising: a battery which supplies a power supply; a detector which detects a state of the power supply of the loaded battery; a flash device configured to illuminate a subject; a charge controller which controls a charge processing of charging an energy supplied to the flash device; a processing part which executes at least one processing requiring an electric power more than a predetermined value except a charge processing; and a part configured to execute the charge processing and at least one processing each unit of a predetermined processing by timesharing while keeping the electric power supplied by the battery to maximum.

An electronic camera device according to the second aspect of the present invention is characterized by comprising: a battery which supplies a power supply; a detector which detects a state of a power supply of the loaded battery; a driver which drives a lens; an imager which images a subject; an image processing part which processes an image data obtained with the imager when a predetermined period is one cycle and whose processing speed is variable; a display which displays the data obtained by the image processing part; a flash device which illuminates the subject; a charge controller which controls charge of an energy supplied to the flash device; and a setting part which performs at least one of processing of the image data by the image processing part and driving of the lens by the driver and the charge control by the charge controller by timesharing, when the data displayed at charging for a predetermined number of cycles, and sets at least one of a processing speed of the image processing part and driving speed of the driver is set according to the usable maximum electric power of the battery.

An electronic camera device according to the third aspect of the present invention is characterized by comprising: an imager which images a subject; an image processing part which processes the image data obtained by the imager at a predetermined cycle; a display which displays the data obtained by the image processing part; a flash device which illuminates the subject; a charge controller which controls a charge of the energy supplied to the flash device; a display controller which controls data displayed on the display to update display every cycles of one cycle or two or more cycles; and a setting part which performs processing of the image data by the image processing part and the charge control by the charge controller at the same time and sets the processing speed by the image processing part according to the usable maximum electric power of the battery to match to the cycle when the data displayed by the display is updated.

An electronic camera device according to the fourth aspect of the present invention is characterized by comprising: a flash device which illuminates a subject; an imager which images the subject; a display which displays an image data obtained by an imager as a visible image; a display controller which can vary a refresh rate by a display; a charge controller which can select an operation whether to charge the flash device when the display by the display is not carried out or to charge the said flash apparatus when the display is carried out by the display; and a changer which changes the refresh rate by the display controller based on a selection result of the charge operation by the charge controller.

The following modes may be applied by properly combining them in each above-mentioned aspect.

(1) An imager configured to image a subject is further provided, and the processing part contains at least one of image processing part which processes an image data obtained by the imager and a driver which drives a lens.

(2) The image processing part changes the processing speed according to a usable maximum electric power of the battery.

(3) The charge control by the charge controller is performed over a whole cycle without the image processing by the image processing part in a predetermined cycle following the second cycle when the same image data is repeatedly displayed on the display over two or more cycles.

(4) A selector which selects and switches whether the processing of image data by the image processing part and the charge control by the charge controller are performed by timesharing or not is further provided.

(5) The image processing part comprises a first image processing part to convert the image signal obtained in the imager into image data which can be memorized to the frame memory and a second image processing part to convert the image data memorized in the memory into the data which can be displayed on the display, and the setting part sets a processing speed of the image processing by the second image processing part according to the usable maximum electric power of the battery.

As mentioned above, by performing the charge of each unit of the predetermined processing of the flash apparatus and other processing at the same time or by timesharing not to perform the charge of the flash apparatus and other processing completely independently, the operation for the following photograph is possible while the flash apparatus is charged, and convenience as a camera can be improved.

For instance, though the image processing is required each every cycle of the display when the through image under the photograph is displayed on the display, the interval time afterwards can be used to the charge of the flash device by finishing this image processing at shorter time than one cycle. Here, the above-mentioned interval time becomes long by setting the speed of the image processing in maximum according to the electric power of the battery which is in use. It becomes possible to increase the amount of the charge at each cycle, and charging the flash device efficiently.

Additionally, it is possible to perform the present invention by modifying them within the scope of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic camera device comprising:

a flash device configured to illuminate a subject;

a charge controller which controls a charge processing of charging the flash device;

a processing part configured to execute at least one processing, other than the charge processing, which requires electric power that is more than a predetermined value, the processing part being operated at a speed set in accordance with a maximum amount of the electric power that is presently usable to minimize a processing time of said at least one processing; and a setting part configured to execute the charge processing and said at least one processing by sharing a time for supplying the electric power, such that the charge processing is performed using time for supplying the electric power freed by minimizing the processing time of said at least one processing.

2. The electronic camera device according to claim 1, further comprising an imager configured to image a subject, wherein the processing part includes at least one of an image processing section which processes image data obtained by the imager and a driver which drives a lens.

3. The electronic camera device according to claim 2, further comprising a selector configured to select whether or not the image processing and the charge processing are performed by sharing the time for supplying the electric power.

4. The electronic camera device according to claim 2, wherein the image processing section comprises a first image processing section configured to convert the image data obtained by the imager into image data which can be memorized to a frame memory and a second image processing section configured to convert the image data memorized in the memory into data which can be displayed on a display, and wherein the image processing by the second image processing part and the charge processing of the flash device are performed by sharing the time for supplying the electric power.

5. The electronic camera device according to claim 4, further comprising a selector configured to select whether or not the image processing by the second processing part and the charge-processing are performed by sharing the time for supplying the electric power.

6. The electronic camera device according to claim 1, wherein the processing part has a variable operation speed, and the setting part sets the operation speed of the processing part in accordance with the maximum amount of the electric power that is presently usable to minimize the processing time of said at least one processing.

* * * * *